Aug. 7, 1956    W. M. HENDERSON    2,757,943
PIPE COUPLING WITH RUBBER GASKET HAVING
AN EMBEDDED METALLIC SPLIT RING
Filed May 14, 1952
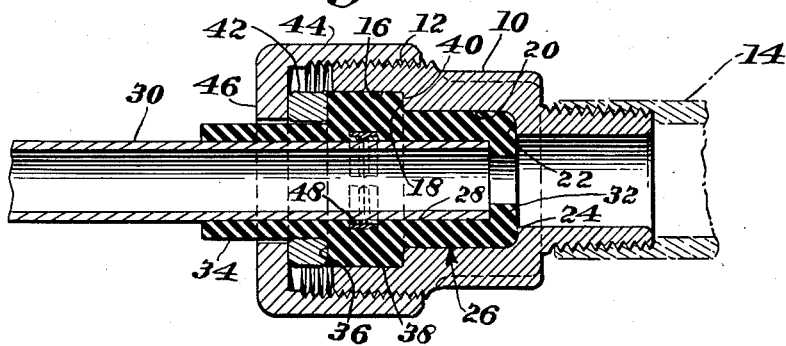
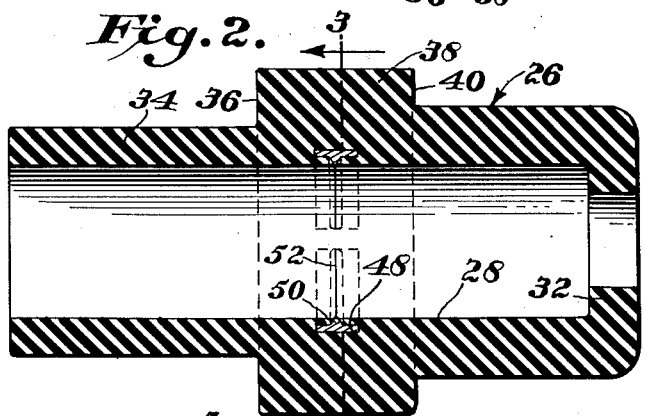
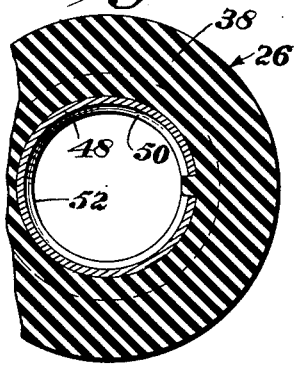
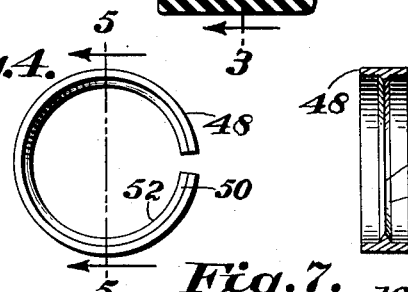
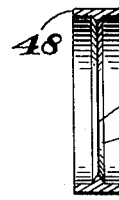
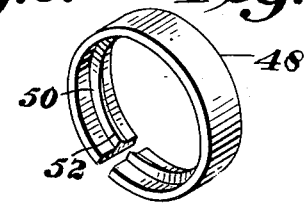
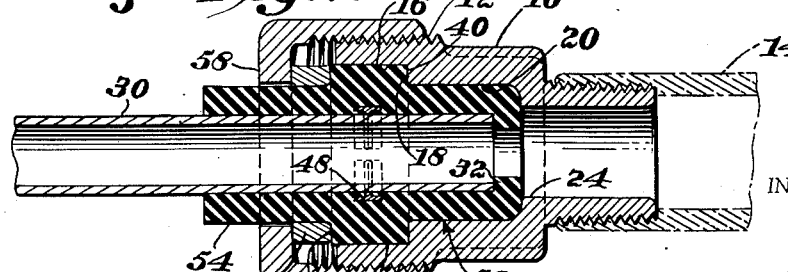
INVENTOR:
William M. Henderson
BY Cushman, Darby & Cushman
ATTORNEYS United States Patent Office 2,757,943
Patented Aug. 7, 1956

2,757,943

PIPE COUPLING WITH RUBBER GASKET HAVING AN IMBEDDED METALLIC SPLIT RING

William M. Henderson, Los Angeles, Calif., assignor to Mueller Co., Decatur, Ill., a corporation of Illinois Application May 14, 1952, Serial No. 287,753

1 Claim. (Cl. 285—52)

This invention pertains to pipe joints or couplings, and more particularly to a pipe joint or fitting having an electrical insulator interposed between interfitting tubular members to prevent electrolytic action therebetween. More especially, this invention relates to an improvement on the insulated pipe coupling disclosed in the copending application of Reedy et al., Serial No. 243,246, filed August 23, 1951, now abandoned.

The aforementioned copending application discloses a pipe joint of the packed socket type which may be termed a compression joint. The joint comprises a hollow fitting body which is interiorly enlarged at its terminal end to provide an annular recess for a packing gasket that engages the exterior surface of a smooth-walled pipe or tube inserted or telescoped within the fitting. The gasket which consists of yieldable material having electrical insulating characteristics, has a cylindrical tubular extension projecting outwardly of the packing recess. A follower ring is engaged with an exterior shoulder on the gasket, which ring is, in turn, engaged by a coupling nut threaded onto the body for compressing the gasket into tight sealing engagement with both the walls of the recess in the fitting and the exterior wall of the inserted pipe. The inner end of the recess terminates in a substantially flat annular shoulder while the corresponding end of the gasket is provided with a radially inwardly extending circumferential flange which forms an abutment for the inner end of the received pipe. Obviously, such inner abutment prevents contact between the inner end of the pipe and the fitting, while the outer tubular gasket extension prevents contact between the pipe and the follower ring and coupling nut.

The above described gasket is provided with an exterior circumferential enlargement between its ends, which enlargement is provided with flat end faces, one engaged by the follower ring, and the other engaged with a corresponding shoulder in the fitting recess. The outer end face of such enlargement is substantially flush with the outer end of the fitting when the gasket is relaxed, and the follower ring has an outer diameter slightly less than that of the outer end of the packing recess. Thus, when the coupling nut is tightened, the follower ring may move into the outer end of the recess and thereby compress the annular enlargement on the packing directly against the shoulder in the recess engaged with the inner end face of the packing enlargement. Such compression tends to contract the gasket into tight sealing engagement with the periphery of the pipe and also to expand such enlargement into tight sealing engagement with the walls of the packing recess in the fitting.

An important feature of this arrangement lies in the fact that the rubber is completely confined between opposed flat shoulders, i. e., the coupling ring and the shoulder within the packing recess, so that flow or "creep" of the rubber does not occur and the joint remains serviceable without leakage over extended periods of time. The aforedescribed lack of "creep" is due mainly to the fact that the wall thickness of the annular gasket on opposite sides of its annular enlargement is relatively small, so that the joint has and retains a relatively high pull-out strength, that is, the force necessary to pull the smooth-walled pipe or tube out of the fitting once the coupling nut has been tightened.

The aforementioned electrically insulated joint, while extremely satisfactory for its intended purpose, does not have adequate pull-out strength under certain usages. In particular, it is desirable to manufacture fitting bodies of the aforedescribed type in several relatively standard sizes. Tubes or smooth-walled pipes to be coupled into such fittings, however, are not always manufactured in standard sizes, so that it is frequently necessary to couple an undersized tube into a standard fitting. For this purpose the insulating gasket or sleeve may be of increased wall thickness to decrease its inner diameter, thereby compensating for the undersize of the tube. In other words, insulating gaskets or sleeves may be manufactured in various tube sizes for a particular size fitting, that is, the exterior dimensions of the gasket will be constant, while the interior dimensions will be varied to accommodate tubes of various outer diameters.

While the foregoing variations of inner gasket diameter with a constant outer exterior dimension is practical, as the wall thickness of the insulating gasket or sleeve is increased, the pull-out strength of the joint tends to decrease. Such decreasing pull-out strength results from the fact that the rubber when under compression tends to flow longitudinally outwardly along the tube between the coupling ring and nut and longitudinally inwardly between the inner end of the tube and the walls of the inner end of the packing recess. Such flow is accentuated with increased wall thickness of the gasket on opposite sides of its annular enlargement.

Hence, it is an object of this invention to provide an electrically insulated pipe joint of the type under consideration of increased pull-out strength.

It is another object of this invention to provide an electrically insulated pipe joint of the type under consideration which is of simple and consequently inexpensive design and yet which retains adequate pull-out strength when an undersized tube is coupled to a standard size fitting.

It is still another object of this invention to provide an improved electrical insulating packing gasket of the type under consideration with means for firmly gripping the periphery of the coupled tube to thereby provide a high pull-out strength to any joint employing such gasket.

Other objects and advantages of the invention will be apparent from the following description and accompanying drawings, in which:

Figure 1 is a longitudinal sectional view of a pipe joint embodying this invention.

Figure 2 is an enlarged longitudinal sectional view of the packing gasket shown in Figure 1.

Figure 3 is a sectional view taken on the line 3—3 of Figure 2.

Figure 4 is an end view of the metallic insert in the packing gasket.

Figure 5 is a diametrical sectional view of the ring shown in Figure 4.

Figure 6 is a perspective view of the ring shown in Figure 4.

Figure 7 is a view corresponding to Figure 1, but illustrating a slightly modified form of packing gasket.

Referring now to Figures 1 and 2 of the drawings, a fitting for use with an insulating gasket embodying this invention includes a tubular body 10 having exterior threads 12 on its terminal portion. The body 10 may be an adapted fitting threaded into the end of a pipe 14, illustrated by dotted lines, for effecting a bell and spigot connection, may constitute the inlet and/or outlet end of a valve or the side outlet of a service T, or may consist of a separate fitting, such as an elbow, and so forth. The terminal portion of the body 10 is interiorly enlarged to provide an annular packing recess having an outer smooth-walled cylindrical section 16 joined, by an outwardly facing annular shoulder 18, with an inner smooth-walled cylindrical section 20 of reduced diameter. This latter inner section 20 terminates at its inner end in a flat annular shoulder 22 which is centrally apertured, as at 24, for fluid flow through the fitting.

Disposed within the packing recess is an annular packing gasket 26, preferably of substantially uniform composition throughout, and formed of a yieldable electrical insulating material having adequate packing qualities. Preferably, the gasket 26 is made of rubber or a rubber composition. The outer surface of the gasket 26 is complementary to the walls of the packing recess while the inner surface 28 of the gasket is cylindrical and of a diameter to snugly receive, without undue forcing, a smooth-walled tube or pipe 30. Normally, in a joint of this nature the fitting body 10 is formed of iron or the like, while the tube or pipe 30 joined thereto is formed of copper or brass. Hence, unless electrically insulated, electrolytic action between such dissimilar metals eventually destroys the joint mechanically as well as permitting leakage therefrom.

The inner end of the gasket 26 is provided with a radially inwardly extending circumferential flange 32 of appreciable axial extent to provide an abutment for the inner end of the tube 30. It will be seen that because of the durability of the gasket 26 and the thickness of the flange 32, the pipe 30 may be forced tightly into the gasket into engagement with the abutment formed by the flange 32 with no danger of the flange yielding so as to allow the pipe to pass therethrough and possibly contact the body 10 of the fitting at this point and thereby completely destroy the insulating effect of the gasket.

The gasket 26 is provided with a cylindrical outwardly-extending extension 34 of the same inner diameter as that of the main portion of the gasket, but of an outer diameter less than the diameter of the outer section 16 of the recess. Hence, the gasket 26 has an outwardly-facing flat annular shoulder 36 disposed substantially flush with the end of the body 10. In other words, the gasket 26 is provided between its ends with an annular enlargement 38 having a cylindrical exterior surface and flat annular end faces 36 and 40. The outer end face 36 of such enlargement, when the gasket 26 is disposed within the packing recess in the body 10, projects only very slightly beyond the outer end of the body and for all practical purposes is substantially flush with such end.

Engaged against the shoulder 36 of the gasket 26 is a metallic rigid packing or follower ring 42 having flat end faces and cylindrical inner and outer surfaces, respectively. The outer diameter of the packing ring 42 is only very slightly less than the diameter of the outer cylindrical section 16 of the packing recess, so that when the packing ring is forced against the gasket 26, as later described, the ring may be received within the packing recess and thus avoid pinching off the gasket at the outer edge of the shoulder 36. The inner diameter of the packing ring 42 is only slightly larger than the outer diameter of the gasket extension 34.

Engaged with the threads 12 on the body 10 is a coupling nut 44 having a radially inwardly extending flange 46 at its outer end for engagement with the outer end or face of the follower ring 42. It will be noted that the gasket extension 34 extends outwardly beyond both the follower ring 42 and the coupling nut 44 so as to effectively insulate the tube 30 from engagement with either of these parts.

Embedded within the gasket 26, at a longitudinal location of the latter substantially midway between the opposite ends 36 and 40 of the gasket enlargement 38, is a metallic split ring 48, preferably of spring steel or the like material. This ring 48, which is molded into the body of the gasket 26 during the formation of the latter, is substantially rectangular in radial section, having a radial dimension which is relatively small as compared to a longitudinal dimension. The inner diameter of such ring 48 is slightly greater than the inner diameter of the gasket 26. Intermediate its end faces the ring 48 is provided with a radially-inwardly extending circumferential flange 50 having a sharp circumferential edge 52 disposed substantially flush with the inner cylindrical surface 28 of the gasket 26. The ring 48 has been described as being a split ring, but it will be understood that, as illustrated in Figures 3, 4, and 6 of the drawings, a section or segment is omitted from the ring so that it may be contracted, by appropriate forces, to decrease its diameter.

In use of the fitting and as shown in Figure 1, the smooth-walled tube or pipe 30 is inserted therein until the inner end of such pipe engages against the abutment formed by the radially-inwardly extending flange 32 on the inner end of the gasket 26. Thereupon the coupling nut 44 is tightened to effect a tight leak-proof joint. Upon such tightening of the nut 44, the follower ring 42 is forced into engagement with the outer annular flat shoulder 36 on the gasket, thereby exerting a considerable thrust against such shoulder substantially in longitudinal alignment with the shoulder 18 separating the dissimilar sections 16 and 20 of the packing recess. Therefore, the rubber forming the annular enlargement 38 on the gasket 26 is confined between the ring 42 and the shoulder 18 as well as between the cylindrical wall surface of the larger recess section 16 and the exterior surface of the tube 30 so that the gasket tightly and sealingly engages both the walls of the outer recess section and the periphery of the tube at a longitudinal location aligned with the enlargement 38.

It will be seen, however, that because of the relatively small diameter of the tube 30 as compared to the packing recess, the wall thickness of that section of the gasket 26 disposed within the inner section 20 of the recess, and also the wall thickness of the gasket extension 34, are relatively large. Because of this large wall thickness, when the gasket enlargement 38 is under compression rubber may flow somewhat both outwardly between the tube 30 and the follower ring 42 and inwardly between the tube and the walls of the inner section 20 of the packing recess. This flowing of the rubber tends to lessen the compression of the joint and to thereby weaken its pull-out strength, that is, the force necessary to pull the tube 30 out of the body 10.

It will be noted, however, that when the annular enlargement portion 38 of the gasket 26 is compressed upon tightening of the coupling nut 44, the rubber exerts a radially-inwardly directed force substantially uniformly about the entire periphery of the split ring 48 to thereby contract and press the same into tight engagement with the outer surface of the pipe or tube 30. Since the pipe or tube 30 normally is of relatively soft material, such as copper or brass, as compared to the material of the ring 48, preferably spring steel, the sharp edge 52 of the flange 50 on the ring will bite into the outer surface of the tube 30. Such biting engagement of the ring 48 will grip the tube 30 sufficiently to raise the pull-out strength of the joint far above the pull-out strength which would be effected even if the aforementioned wall thicknesses were substantially decreased so that the ring 48 could be omitted from the gasket 26. In this connection, it will be noted that the rather large outer peripheral area of the ring 48, best shown in Figure 6, provides a rather broad annular band which may be acted upon by the rubber, when the latter is in compression, to contract the ring into tight gripping engagement with the pipe 30.

The modification of the joint shown in Figure 7 is substantially the same as that shown in Figure 1. In the former instance, however, the tubular extension 54 of the gasket 56 is of substantially the same wall thickness as the inner portion of the gasket 56 received within the inner section 20 of the packing recess, while in the embodiment shown in Figure 1 the tubular gasket extension 34 is of reduced wall thickness as compared to that portion of the gasket 26 received within the inner section 20 of the packing recess. Hence, while the body 10 is the same as that shown in Figure 1, the inner diameter of the flange 58 on the nut 60 and of the follower ring 62 are enlarged to accommodate the gasket extension 54.

It will thus be seen that the objects of this invention have been fully and effectively accomplished. It will be realized, however, that the specific embodiment shown and described for the purpose of illustrating the principles of this invention are subject to modification without departing from such principles. For example, while the split ring and sharp inwardly extending circumferential flange construction are preferred, it will be seen that the radially-inwardly extending pipe-gripping portions of the ring may be formed by a plurality of radially-inwardly extending projections having pointed inner ends, or that the ring may be formed in several sections instead of as an integral unit. Therefore, this invention includes all modifications encompassed within the spirit and scope of the following claim.

I claim:

In an electrically insulated pipe joint the combination comprising: a hollow body having a terminal portion provided with a circular packing recess, said recess having an inner cylindrical section terminating at its inner end in a substantially flat annular shoulder and an outer cylindrical section of larger diameter than said inner section and separated therefrom by a substantially flat annular shoulder; a one-piece yielding annular gasket of rubber-like electrical insulating material disposed in and complementary to said recess with the inner end of said gasket seated against said first-mentioned recess shoulder, said gasket having a cylindrical pipe-receiving aperture terminating at its inner end in a radially-inwardly extending circumferential flange to form an abutment for the inner end of a pipe inserted in said gasket, said gasket further having an outer cylindrical extension of lesser outside diameter than that of the outer end of said recess to form an annular substantially flat shoulder on said gasket disposed substantially flush with the outer end of said recess when said gasket is relaxed; a rigid follower ring encircling said extension and seated against said last-mentioned shoulder, the inner and outer diameter of said ring being, respectively, slightly larger than the outer diameter of said extension and slightly smaller than the inner diameter of said outer recess section; means connected to said body for forcefully urging said ring against said last-mentioned shoulder; and a metallic split ring embedded in said gasket adjacent the inner periphery thereof and at a longitudinal location therein between said last-mentioned shoulder and said recess shoulder which separates said recess section, said ring being substantially T-shaped in radial section with the leg of the T extending radially inwardly and terminating in a sharp edge substantially flush with the inner surface of said gasket aperture, the entire surface of said ring, except said edge, being covered by said gasket material.

References Cited in the file of this patent

UNITED STATES PATENTS

| | | |
|---|---|---|
| 625,155 | Dresser | May 16, 1899 |
| 2,099,722 | Byers | Nov. 23, 1937 |
| 2,219,289 | Bennett | Oct. 29, 1940 |
| 2,241,026 | Wylie | May 6, 1941 |
| 2,269,695 | Scharf | Jan. 13, 1942 |
| 2,294,160 | Crane | Aug. 25, 1942 |
| 2,423,655 | Mars | July 8, 1947 |
| 2,465,972 | Stephens | Mar. 29, 1949 |
| 2,586,950 | Hynes | Feb. 26, 1952 |
| 2,613,086 | Wolfram | Oct. 7, 1952 |